United States Patent
Jin et al.

(10) Patent No.: US 9,451,540 B2
(45) Date of Patent: Sep. 20, 2016

(54) SYSTEM AND METHOD FOR NETWORK SELECTION

(71) Applicant: FutureWei Technologies, Inc., Plano, TX (US)

(72) Inventors: Weisheng Jin, Shanghai (CN); Zhixian Xiang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/152,066

(22) Filed: Jan. 10, 2014

(65) Prior Publication Data

US 2014/0200000 A1    Jul. 17, 2014

Related U.S. Application Data

(60) Provisional application No. 61/751,642, filed on Jan. 11, 2013.

(51) Int. Cl.
| | |
|---|---|
| *H04W 48/18* | (2009.01) |
| *H04W 76/02* | (2009.01) |
| *H04W 48/14* | (2009.01) |
| *H04W 84/12* | (2009.01) |

(52) U.S. Cl.
CPC ........... *H04W 48/18* (2013.01); *H04W 76/028* (2013.01); *H04W 48/14* (2013.01); *H04W 84/12* (2013.01)

(58) Field of Classification Search
CPC . H04W 48/18; H04W 76/028; H04W 48/14; H04W 48/8412
USPC .................. 455/435.2, 552.1, 456.1; 370/331
See application file for complete search history.

(56) References Cited

U.S. PATENT DOCUMENTS

| 8,279,786 B1 | 10/2012 | Smith et al. |
| 2010/0003980 A1 | 1/2010 | Rune et al. |
| 2010/0189087 A1* | 7/2010 | Hara et al. ..................... 370/338 |
| 2011/0110300 A1* | 5/2011 | Sachs .................... H04W 48/18 370/328 |
| 2012/0238287 A1 | 9/2012 | Scherzer |

(Continued)

OTHER PUBLICATIONS

3rd Generation Partnership Project; Technical Specification Services and System Aspects; 3GPP system to Wireless Local Area Network (WLAN) interworking; System description; (Release 11). 3GPP TS 24.234 V11.0.0, Sep. 2012, 84 pages.

(Continued)

*Primary Examiner* — Barry Taylor
(74) *Attorney, Agent, or Firm* — Slater Matsil, LLP

(57) ABSTRACT

Embodiments are provided for supporting network selection for wireless networks and network service providers/operators. The embodiments include procedures that integrate wireless network and service provider/operator selection policies and methods. In an embodiment, the UE obtains a network selection policy from a network, and hence generates a list of candidate wireless networks according to the network selection policy. The UE then selects from the list a wireless network to connect to according to a service provider selection policy. Such procedures improve Access Network Discovery and Selection Function (ANDSF) based wireless local area network (WLAN) selection with service provider selection capability. The procedures also collaborate ANDSF based policy and existing I-WLAN selection, and resolve conflicts between 3GPP WLAN selection and ANDSF policy for WLAN selection.

20 Claims, 3 Drawing Sheets

(56) References Cited

U.S. PATENT DOCUMENTS

2013/0083772 A1\* 4/2013 Hata .............................. 370/331
2014/0092886 A1\* 4/2014 Gupta ............................ 370/338

OTHER PUBLICATIONS

3rd Generation Partnership Project; Technical Specification Group Core Network and Terminals; 3GPP System to Wireless Local Area Network (WLAN) interworking; WLAN User Equipment (WLAN UE) to network protocols; Stage 3 (Release 11), 3GPP TS 24.234 V11.3.0, Jun. 2006, 41 pages.
"WLAN access network selection based on WLANSP rules." Change Request, S2-133690, SA WG2 Meeting #99, Sep. 23-27, 2013, Xiamen, P.R. China, 2 pages.
LTE, "3rd Generation Partnership Project; Technical Specification Group Services and System Aspects; 3GPP System to Wireless Local Area Network (WLAN) interworking; System Description (Release 11)," 3GPP TS 23.234 v11.0.0, Sep. 2012, 84 pages.
LTE, "3rd Generation Partnership Project; Technical Specification Group Services and System Aspects; Architecture enhancements for non-3GPP Accesses (Release 11)," 3GPP TS 23.402 v11.5.0, Dec. 2012, 252 pages.
LTE, "3rd Generation Partnership Project; Technial Specification Group Core Network and Terminals; Access to the 3GPP Evolved Packet Core (EPC) via non-3GPP Access Networks; Stage 3 (Release 11)," 3GPP TS 24.302 v11.5.0, Dec. 2012, 61 pages.
LTE, "3rd Generation Partnership Project; Technical Specification Group Core Network and Terminals; Access Network Discovery and Selection Function (ANDSF) Management Object (MO) (Release 11)," 3GPP TS 24.312 v11.5.0, Dec. 2012, 111 pages.
International Search Report received in Application No. PCT/US14/11058, mailed May 6, 2014, 9 pages.
3rd Generation Partnership Project;"Technical Specification Group Services and System Aspects;Architecture enhancements for non-3GPP accesses; Architecture enhancements for non-3GPP accesses", (Release 13), 3GPP TS 23.402 V13.2.0., Jun. 2015, 292 pages.

\* cited by examiner

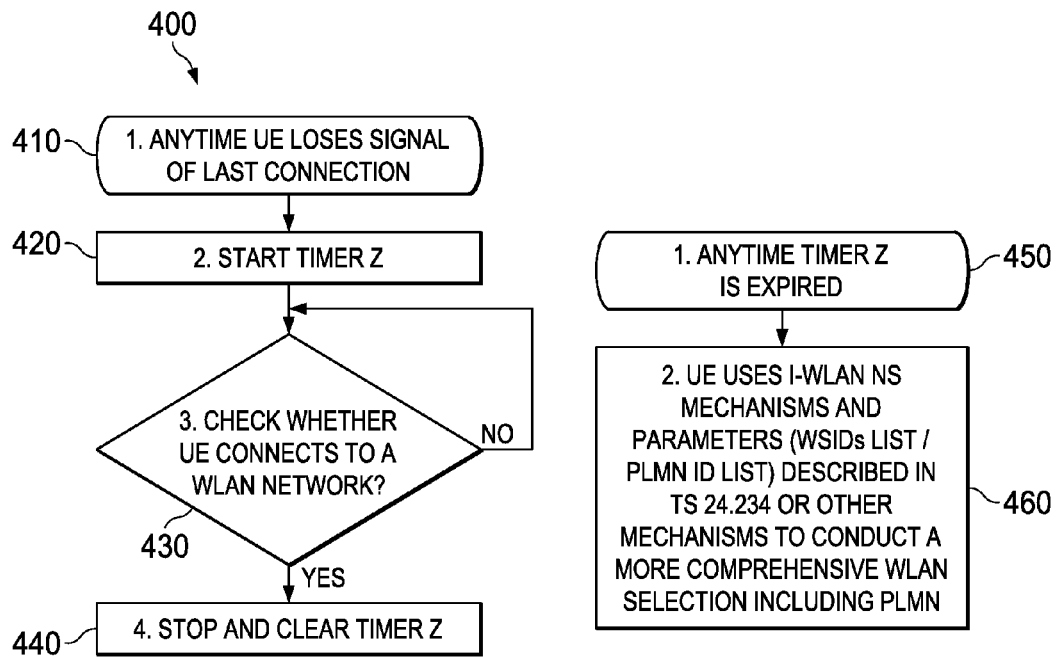
FIG. 4a
FIG. 4b
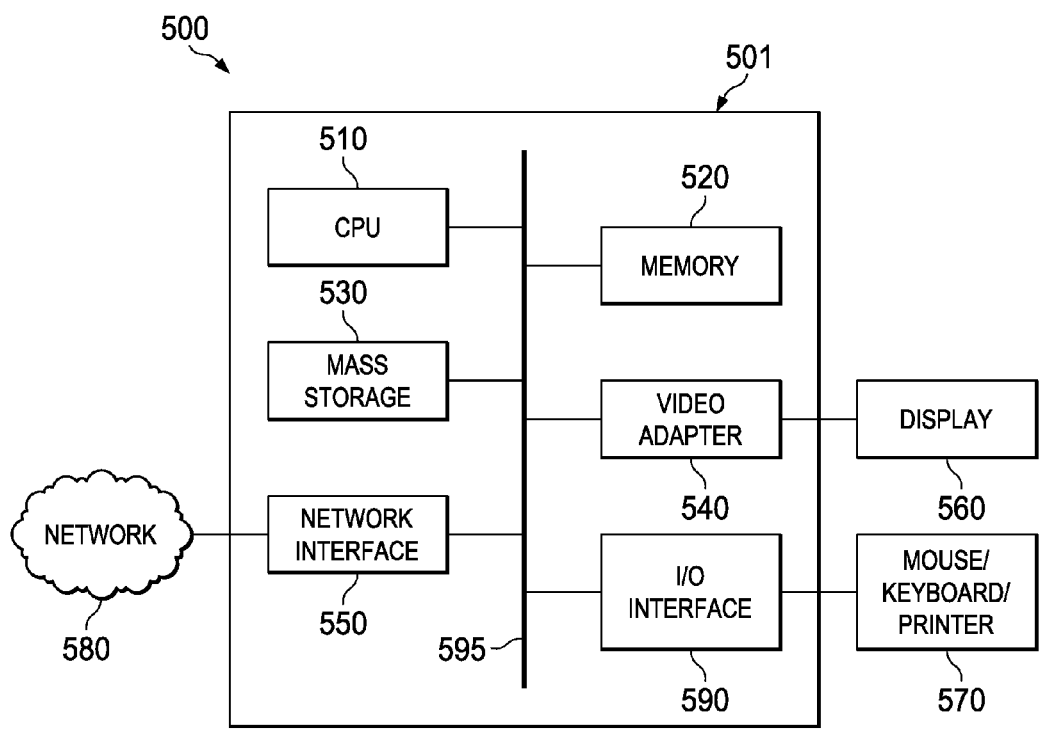
FIG. 5

SYSTEM AND METHOD FOR NETWORK SELECTION

This application claims the benefit of U.S. Provisional Application No. 61/751,642 filed on Jan. 11, 2013 by Weisheng Jin and Zhixian Xiang and entitled "System and Method for Network Selection," which is hereby incorporated herein by reference as if reproduced in its entirety.

TECHNICAL FIELD

The present invention relates to the field of wireless communications, and, in particular embodiments, to a system and method for network selection.

BACKGROUND

WiFi is becoming an important component of cellular operators to help them meet the market demand and increase their competition edge. Cellular operators are motivated to integrate WiFi access into their existing cellular networks, and many current mobile devices have dual mode (WiFi and cellular) capability. The 3rd Generation Partnership Project (3GPP) defines several mechanisms for mobile devices to decide and select the wireless local area network (WLAN), such as via policies that may be statically pre-configured by the operator on the UE, or dynamically set by the operator via an Access Network Discovery and Selection Function (ANDSF) within the network. The 3GPP includes WiFi network selection using ANDSF. The WLAN selection includes public land mobile network (PLMN) selection which is selecting the service provider of the WLAN, and WiFi network selection which is selecting the actual WiFi network within one service operator. The 3GPP also includes internetworking WLAN (I-WLAN) network selection mechanism and parameters for network selection. There is a need for a network selection procedure that efficiently integrates network selection and service provider selection policies.

SUMMARY OF THE INVENTION

In accordance with an embodiment, a method implemented by a user equipment (UE) for network selection includes obtaining a network selection policy from a network, and generating a list of candidate wireless networks according to the network selection policy. A wireless network is then selected to connect to from the list according to a service provider selection policy.

In accordance with another embodiment, a method implemented by a user device for network selection includes, upon determining that a network selection policy is available, obtaining the network selection policy, and generating a list of candidate wireless networks according to the network selection policy. A provider selection policy is then obtained, upon determining that a service provider selection policy is available. The method further includes generating a list of candidate service providers according to the service provider selection policy. A wireless network is then selected to connect to according to the list of candidate wireless networks and the list of candidate service providers.

In accordance with yet another embodiment, a UE enabled for network selection comprises at least one processor and a non-transitory computer readable storage medium storing programming for execution by the at least one processor. The programming includes instructions to, upon determining that a network selection policy is available, obtain the network selection policy. A list of candidate wireless networks is then generated according to the network selection policy. The programming includes further instructions to, upon determining that a service provider selection policy is available, obtain the provider selection policy, and generate a list of candidate service providers according to the service provider selection policy. The Programming further configures the UE to select a wireless network to connect to according to the list of candidate wireless networks and the list of candidate service providers.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a and 4b illustrate another embodiment of a method for network selection; and FIG. 5 is a diagram of a processing system that can be used to implement various embodiments.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for supporting network selection for wireless networks and network service providers/operators. The embodiments include procedures that integrate wireless network (e.g., WLAN) and service provider/operator selection policies and methods. The procedures can improve ANDSF based WLAN selection with service provider selection capability. The procedures also collaborate ANDSF based policy and existing I-WLAN selection, and resolve conflicts between 3GPP WLAN selection and ANDSF policy for WLAN selection. In an embodiment, the ANDSF is used first by a user equipment (UE) to obtain a candidate WLAN list. The UE can then perform PLMN selection, or other suitable service provider selection, from the obtained candidate WLANs. This procedure can co-exist with I-WLAN if I-WLAN policy is also provided. A signaling loss timer, Z, is also introduced. The Z timer defines a time window for the UE to use the ANDSF, e.g., instead of going through full network selection, including the I-WLAN selection if it is supported. Within this time interval, the UE can obtain the network selection parameters, such as WLAN specific identifiers (WSIDs), according to the ANDSF.

Figure 1:
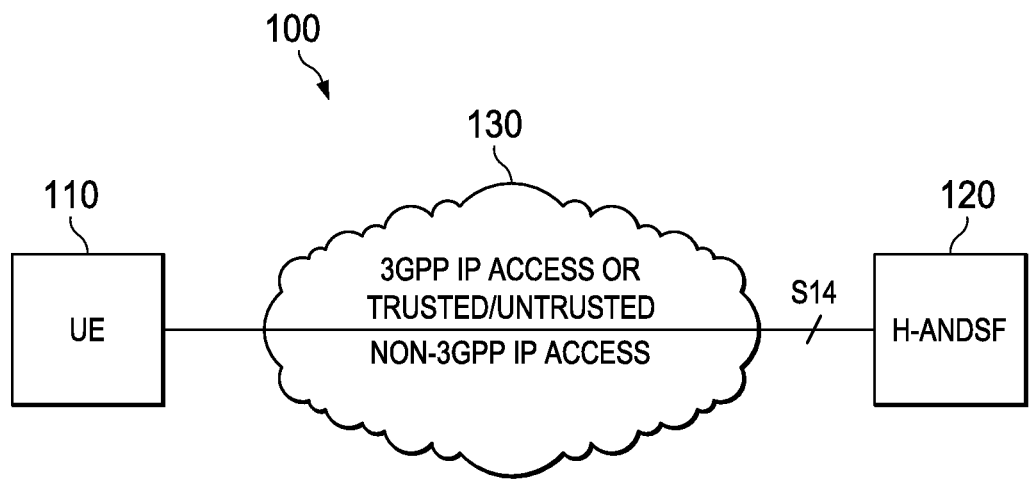
FIG. 1 illustrates a system for network selection policy via ANDSF.

FIG. 1 illustrates a system 100 for network selection policy via an ANDSF. A UE 110 interacts with an ANDSF server 120 through S14 interface which is Internet Protocol (IP) level signaling to get network selection policy from a network. The UE 110 is any communications device with wireless communications capability, e.g., a smartphone, a computer tablet or laptop, or any other mobile or wireless connection device. The UE may be a dual mode device that supports operating both 3GPP and WiFi technologies, either simultaneously or one technology at a time. The UE 110 can access the ANDSF server 120 via an IP network 130, e.g., via 3GPP IP access or via trusted/untrusted non-3GPP IP access. Through the IP network 130, the UE 110 interacts with the ANDSF server 120 using the S14 interface. The ANDSF server 120 may populate the policy to the UE 110 in one of two ways. Using a push mode, the ANDSF server 120 pushes the policy information to the UE 110. Alternatively, using a pull mode, the UE requests the policy information from the ANDSF server 120.

The policy information provided by the ANDSF server 120 to the UE 110 helps the UE 110 perform WiFi network or WLAN selection. This information includes inter-system routing policy, such as validity conditions indicating when the provided policy is valid. The information can also include one or more filter rules, each identifying a prioritised list of access technologies/access networks to be used by the UE 110 when available for routing traffic that matches specific IP filters on a designated Access Point Name (APN) or on any APN. A filter rule can also identify which radio access technologies are restricted for traffic that matches specific IP filters on a specific APN or on any APN. For example, a WLAN is not allowed for Real-time Transport Protocol (RTP)/RTP Control Protocol (RTCP) traffic flows on APN-x. The ANDSF also provides the UE 110 with access network discovery information and inter-system mobility policy.

In an embodiment, the ANDSF server 120 also provides the UE 110 with policy to perform service provider/operator selection. In another embodiment, the UE 110 performs service provider/operator selection using I-WLAN policy, e.g., as described in 3GPP TS 24.234 and 23.234, which may be preconfigured on the UE 110. The I-WLAN policy includes network selection mechanism and parameters used for network selection. The mechanism specifies how the UE 110 selects a WLAN specific identifier (WSID) and a public land mobile network (PLMN), to associate and access a service, from the WSID list and PLMN ID list stored in a subscriber identity module (SIM)/universal SIM (USIM) card, management entity (ME), user controller, or operator controller. The I-WLAN parameters include the WSID list and PLMN ID list stored in SIM/USIM card, ME, user controller, or operator controller and priority for IDs in both lists and between the lists used for selection. The network may send the WSID list and PLMN ID list to the UE to update the parameters previously stored in the UE.

Figure 2:
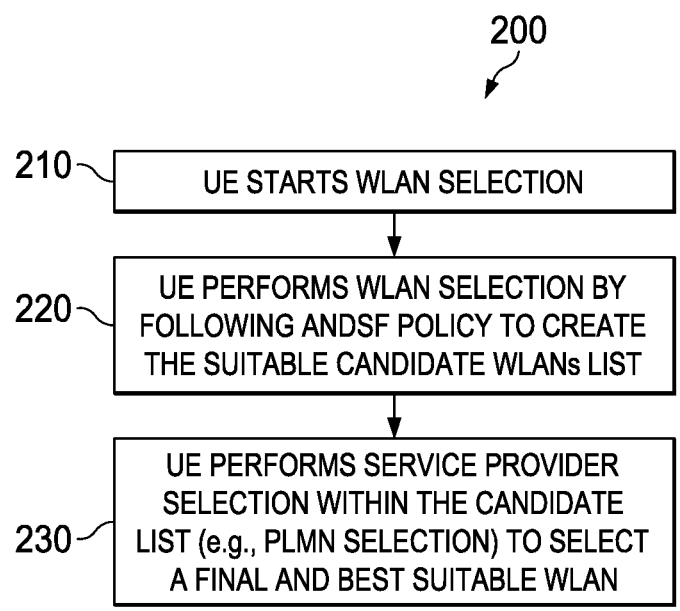
FIG. 2 illustrates an embodiment of a method for network selection.

FIG. 2 illustrates an embodiment of a method 200 for network selection. The method 200 may be used by the UE 110 in the system 100 or by any UE to select a wireless network and a service provider. At step 210, the UE starts the wireless network (e.g., WLAN or WiFi) network selection. At step 220, the UE performs a wireless network selection by following a network (or network operator) provided policy, such as ANDSF policy, to create the suitable candidate wireless networks list. At step 230, the UE performs service provider selection using a candidate provider list, such as via PLMN selection, to select a final best or better wireless network according to both the wireless network list and the service provider list. As described above, the UE may obtain both the network and service provider selection policies using the ANDSF. Alternatively, the network selection policy is obtained via the ANDSF, and the service provider selection policy is determined separately via PLMN selection, I-WLAN policy, or other means. The service provider selection policy may be preconfigured on the UE, while the ANDSF may be obtained when the UE decides to connect to a wireless network. The method 200 may also be implemented using any other suitable wireless network selection function provided by a network, instead of the ANDSF.

Figure 3:
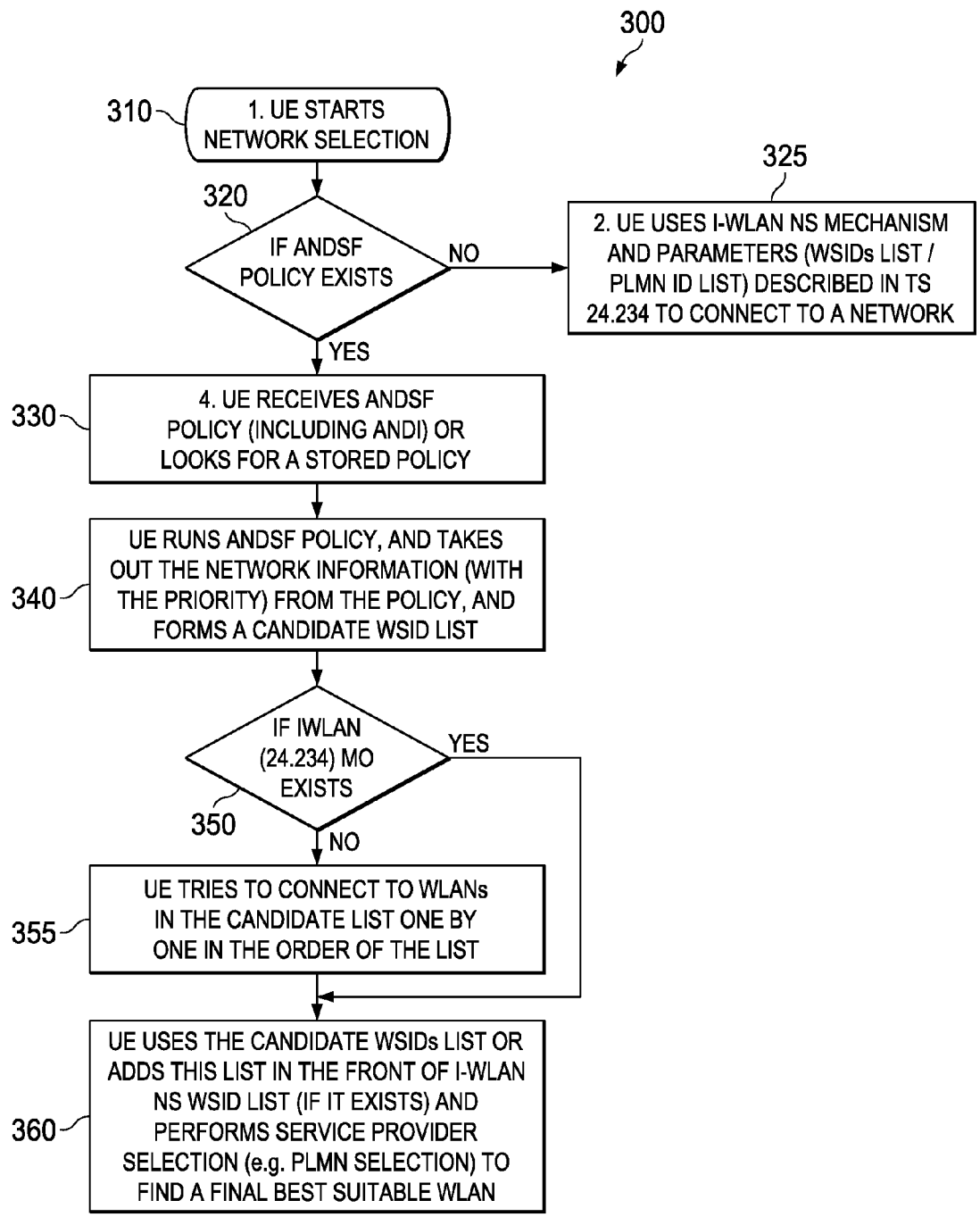
FIG. 3 illustrates another embodiment of a method for network selection.

FIG. 3 illustrates an embodiment of another method 300 for network selection by a UE. At step 310, the UE starts the wireless network (e.g., WLAN or WiFi) network selection. At step 320, the UE checks if ANDSF policy is available. For example, the UE checks whether it can connect to an ANDSF server, e.g., before selecting and connecting to a wireless network. If the policy is not available, then the method 300 proceeds to step 325, where the UE uses an I-WLAN network selection (NS) mechanism and parameters (e.g., WSID list and PLMN ID list) to connect to a network, for example according to TS 24.234. Alternatively, if the ANDSF policy is available, then the method proceeds to step 330, where the UE obtains the ANDSF policy or looks for a stored policy (in the UE). The ANDSF policy includes Access Network Discovery Information (ANDI). At step 340, the UE runs the ANDSF policy and obtains the network information (with priority information) from the policy. Accordingly, the UE forms a candidate list. At step 350, the UE checks if an I-WLAN management object (MO) is available, e.g., stored or preconfigured on the UE. If the I-WLAN information is available, then the method 300 proceeds to step 360. If the I-WLAN information is not available, the method 300 proceeds to step 355, where the UE attempts to connect to wireless networks in the candidate list (according to the I-WLAN information) one by one in the order of the list. The method proceeds after step 355 to step 360. At step 360, the UE uses the candidate WSID list, according to the ANDSF, or adds this list in front of I-WLAN NS WSID list (if available) and performs service provider selection, e.g., PLMN selection, to find a final and best suitable wireless network. The method 300 may also be implemented using any other suitable wireless network selection function provided by a network, instead of the ANDSF, and any other suitable service provider selection, instead of I-WLAN policy.

FIGS. 4a and 4b illustrate another embodiment of a method 400 for network selection by a UE. The method 400 includes steps for applying a signaling loss timer, Z, to use the ANDSF, e.g., instead of going through full network selection which may include the I-WLAN selection if it is supported. At step 410, the UE loses signal of last connection. This triggers the method steps in FIG. 4a. Upon losing the connection, the UE starts the timer Z at step 420. As step 430, the UE checks whether the UE connects to a wireless network (e.g., a WLAN), after the loss of the last connection. If the UE did not connect yet to a wireless network, the step 430 is repeated, as long as the timer Z is running Within the time interval Z, the UE can obtain the network selection parameters, such as WLAN specific identifiers (WSIDs) using the ANDSF. If the UE establishes a connection to a wireless network, then the timer Z is stopped and cleared at step 440. Alternatively, at step 450, the timer Z expires (is not stopped or cleared at step 440). At step 460, upon the Z timer expiring, the UE uses the I-WLAN NS mechanism and parameters (e.g., WSID list and PLMN ID list) to conduct a more comprehensive wireless (e.g., WLAN) network selection including PLMN. For example, the UE performs I-WLAN NS as described in TS 24.234. In other implementations, the UE uses any other suitable wireless network selection and service provider selection mechanisms.

FIG. 5 is a block diagram of an exemplary processing system 500 that can be used to implement various embodiments. Specific devices may utilize all of the components shown, or only a subset of the components and levels of integration may vary from device to device. For example, the devices include user terminals or radio nodes. Furthermore, a device may contain multiple instances of a component, such as multiple processing units, processors, memories, transmitters, receivers, etc. The processing system 500 may comprise a processing unit 501 equipped with one or more input devices, such as a microphone, mouse, touchscreen, keypad, keyboard, and the like. Also, processing system 500 may be equipped with one or more output devices, such as a speaker, a printer, a display, and the like. The processing unit may include central processing unit (CPU) 510, memory 520, mass storage device 530, video adapter 540, and I/O interface 590 connected to a bus 595.

The bus 595 may be one or more of any type of several bus architectures including a memory bus or memory controller, a peripheral bus, video bus, or the like. The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. The mass storage device 530 may comprise any type of storage device configured to store data, programs, and other information and to make the data, programs, and other information accessible via the bus 595. The mass storage device 530 may comprise, for example, one or more of a solid state drive, hard disk drive, a magnetic disk drive, an optical disk drive, or the like.

The video adaptor 540 and I/O interface 590 provide interfaces to couple external input and output devices to the processing unit. As illustrated, examples of input and output devices include the display 560 coupled to the video adapter 540 and the mouse/keyboard/printer 570 coupled to the I/O interface 590. Other devices may be coupled to the processing unit 501, and additional or fewer interface cards may be utilized. For example, a serial interface card (not shown) may be used to provide a serial interface for a printer.

The processing unit 501 also includes one or more network interfaces 550, which may comprise wired links, such as an Ethernet cable or the like, and/or wireless links to access nodes or different networks. The network interface 550 allows the processing unit 501 to communicate with remote units via one or more networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a user equipment (UE) for network selection, the method comprising:
   accessing, by the UE, a list of available networks and a list of available service providers, the list of available networks comprising WLAN specific identifiers (WSIDs) corresponding to each available network, the list of available service providers comprising public land mobile network (PLMN) identifiers corresponding to each available service provider;
   obtaining, by the UE, a network selection policy and a service provider selection policy from an Access Network Discovery and Selection Function (ANDSF) in a network, the service provider selection policy comprising a list of candidate service providers and priority information;
   forming, by the UE, a candidate wireless network list from the list of available networks by following the network selection policy from the ANDSF;
   selecting, by the UE, a PLMN from the list of available service providers by following the service provider selection policy from the ANDSF; and
   connecting, by the UE, to a WSID from the candidate wireless network list according to the selected PLMN.

2. The method of claim 1, wherein the candidate wireless network list comprises a list of WSIDs or other identifiers corresponding to the candidate wireless networks.

3. The method of claim 1, wherein the list of candidate service providers comprises PLMN identifiers or other service provider identifiers corresponding to the candidate service providers.

4. The method of claim 1, wherein the service provider selection policy further comprises an internetworking WLAN policy that is stored in the UE, the internetworking WLAN policy specifying a network selection mechanism and parameters, the network selection mechanism including criteria for selecting the PLMN from the list of available service providers.

5. A method implemented by a user device for network selection, the method comprising:
- upon determining that a network selection policy is available, obtaining, by the user device, the network selection policy from an Access Network Discovery and Selection Function (ANDSF) in a network;
- generating, by the user device, a list of candidate wireless networks according to the network selection policy from the ANDSF;
- upon determining that a service provider selection policy is available, obtaining, by the user device, the service provider selection policy;
- generating, by the user device, a list of candidate service providers according to the service provider selection policy;
- selecting, by the user device, a first wireless network to connect to according to jointly the list of candidate wireless networks and the list of candidate service providers;
- connecting, by the user device, to the first wireless network from the list of candidate wireless networks;
- upon losing connection with the first wireless network, starting, by the user device, a timer;
- attempting, by the user device, to connect to a second wireless network from the list of candidate wireless networks before the timer expires; and
- performing, by the user device, one of stopping the timer upon successfully connecting to the second wireless network before the timer expires, and selecting a third wireless network according to preconfigured parameters on the user device for network selection upon failing to connect to the second wireless network before the timer expires.

6. The method of claim 5 further comprising upon determining that a network selection policy is not available, performing a wireless network selection according to preconfigured parameters on the user device for network selection, wherein the preconfigured parameters on the user device include a list of wireless local area network specific identifiers (WSIDs), a list of public land mobile network (PLMN) identifiers (IDs), and priority information for the WSIDs and the PLMN IDs.

7. The method of claim 5 further comprising upon determining that a service provider selection policy is not available, selecting to connect to a wireless network according to the list of candidate wireless networks.

8. The method of claim 5, wherein the preconfigured parameters include a list of wireless local area network specific identifiers (WSIDs) and a list of public land mobile network (PLMN) identifiers (IDs).

9. The method of claim 5, wherein obtaining the network selection policy comprises receiving the network selection policy from a network.

10. The method of claim 5, wherein the network selection policy is stored on the user device.

11. The method of claim 5, wherein the service provider selection policy is obtained using an internetworking WLAN network selection mechanism and parameters preconfigured on the user device, and wherein the parameters include a list of public land mobile network (PLMN) IDs corresponding to the candidate service providers and priority information for the PLMN IDs.

12. The method of claim 11, wherein the parameters further include a list of wireless local area network specific identifiers (WSIDs) and priority information for the WSIDs, and wherein the method further comprises adding the list of candidate wireless networks in front of the list of WSIDs in order of priority.

13. The method of claim 5, wherein attempting to connect to the second wireless network from the list of candidate wireless networks comprises attempting to connect to the second wireless network according to jointly the list of candidate wireless networks and the list of candidate service providers.

14. The method of claim 5, wherein the first wireless network is selected according to the network selection policy from the ANDSF and the second wireless network is selected according an I-WLAN network selection mechanism preconfigured on the user device.

15. A user equipment (UE) enabled for network selection, the UE comprising:
- at least one processor; and
- a non-transitory computer readable storage medium storing programming for execution by the at least one processor, the programming including instructions to:
  - upon determining that a network selection policy is available, obtain the network selection policy from an Access Network Discovery and Selection Function (ANDSF) in a network;
  - generate a list of candidate wireless networks according to the network selection policy from the ANDSF;
  - upon determining that a service provider selection policy is available, obtain the service provider selection policy;
  - generate a list of candidate service providers according to the service provider selection policy;
  - select a first wireless network to connect to according to jointly the list of candidate wireless networks and the list of candidate service providers;
  - connect to the first wireless network from the list of candidate wireless networks;
  - upon losing connection with the first wireless network, start a timer;
  - attempt to connect to a second wireless network from the list of candidate wireless networks before the timer expires; and
  - perform one of stopping the timer upon successfully connecting to the second wireless network before the timer expires, and selecting a third wireless network according to preconfigured parameters on the UE for network selection upon failing to connect to the second wireless network before the timer expires.

16. The UE of claim 15, wherein the service provider selection policy includes an internetworking WLAN (I-WLAN) network selection mechanism and I-WLAN parameters preconfigured on the UE, wherein the I-WLAN parameters include a list of public land mobile network (PLMN) IDs corresponding to the candidate service providers and a list of wireless local area network specific identifiers (WSIDs), and priority information for the PLMN IDs and the WSIDs, and wherein the programming includes further instructions to add the list of candidate wireless networks in front of the list of WSIDs in order of priority.

17. The UE of claim 15, wherein the programming includes further instructions to, upon determining that a network selection policy is not available, perform a wireless network selection according to preconfigured parameters on the UE for network selection, wherein the preconfigured parameters on the UE include a list of wireless local area network specific identifiers (WSIDs), a list of public land mobile network (PLMN) identifiers (IDs), and priority information for the WSIDs and the PLMN IDs.

18. The UE of claim 15, wherein the programming includes further instructions to, upon determining that a service provider selection policy is not available, select to connect to a wireless network according to the list of candidate wireless networks.

19. The UE of claim 15, wherein the preconfigured parameters include a list of wireless local area network specific identifiers (WSIDs) and a list of public land mobile network (PLMN) identifiers (IDs).

20. The UE of claim 15, where the UE supports both 3GPP cellular and WiFi technologies, and wherein the first wireless network is a wireless local area network (WLAN) or a WiFi network.

* * * * *